Dec. 22, 1964  E. ROESCH  3,162,563
TREAD BUILDER FOR TIRE RETREADING

Filed Oct. 29, 1962  3 Sheets-Sheet 1

INVENTOR.
Ernst Roesch
BY
Webster & Webster
ATTYS.

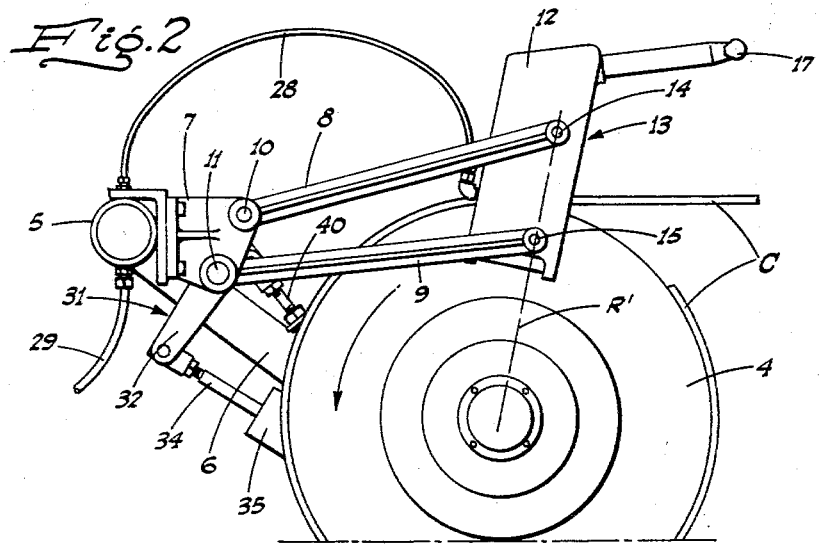
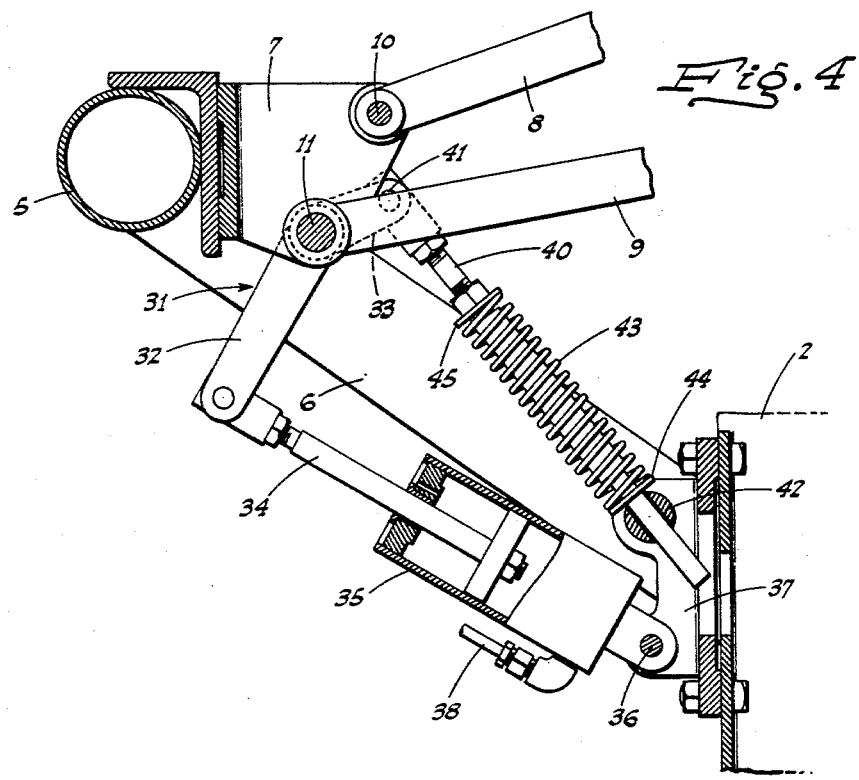

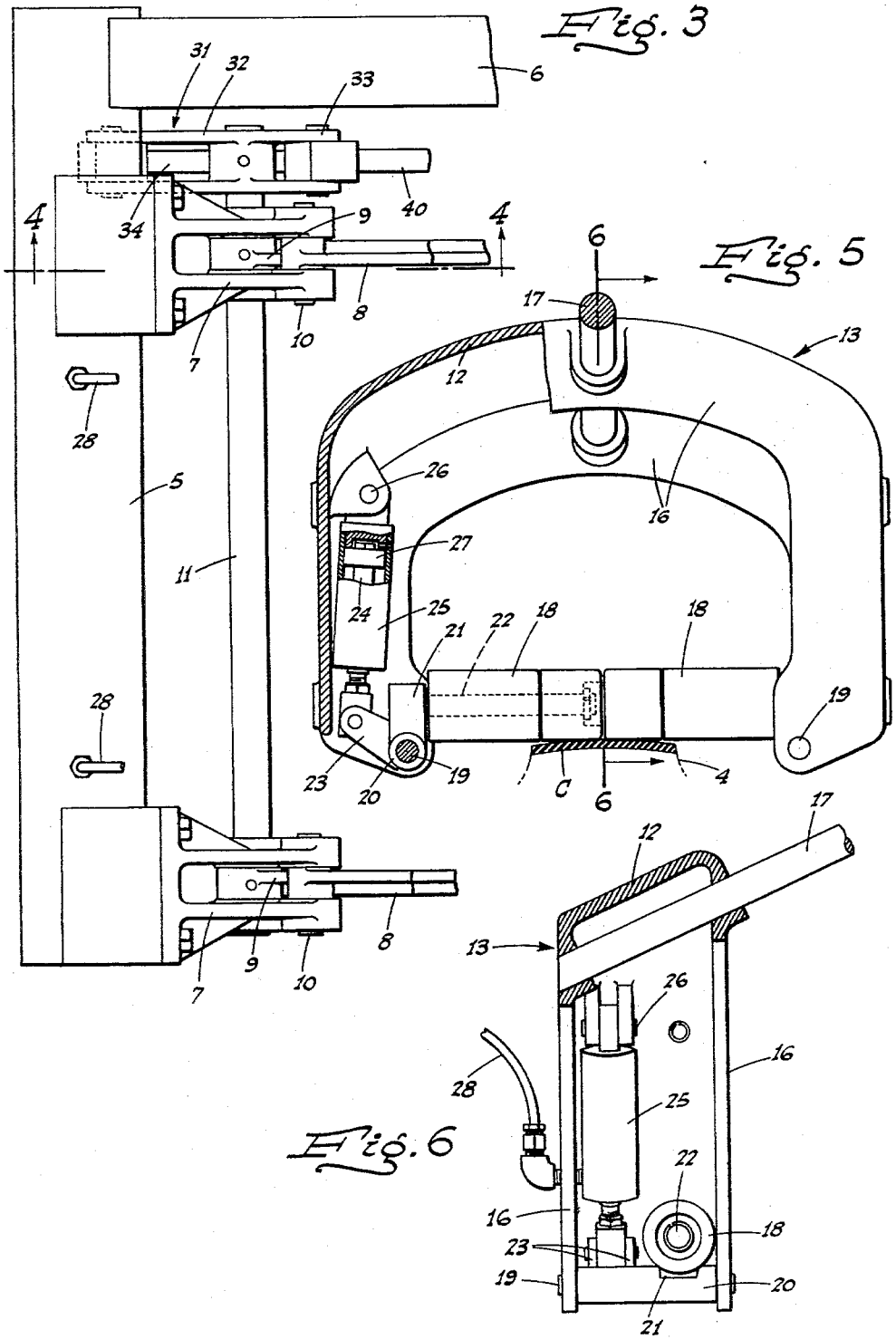

United States Patent Office 3,162,563
Patented Dec. 22, 1964

3,162,563
TREAD BUILDER FOR TIRE RETREADING
Ernst Roesch, Lodi, Calif., assignor to Super Mold Corporation of California, a corporation of California
Filed Oct. 29, 1962, Ser. No. 233,515
9 Claims. (Cl. 156—411)

This invention relates to tire retreading equipment, and particularly to an improved stitching apparatus used for applying and securing the new camelback rubber to the tire being retreaded.

One of the objects of this invention is to provide, in a device of this kind which includes stitching rollers for engagement with the tread rubber, a means operatively connected to and acting on the rollers so that they will exert a uniform pressure on the camelback or tread rubber as it is stitched, irrespective of the position assumed by the rollers as the stitching operation is being effected.

The stitching rollers are mounted in a vertically movable operator-manipulated stitching head, and another object of the invention is to provide pressure means, acting on the mounting means of the stitcher head, so that a power-assist action is imparted to the head, lessening the physical effort necessary on the part of the operator when lowering the head and effecting a stitching operation therewith.

In connection with the objects recited above, it is a further object of this invention to arrange the means which exerts the pressure on the stitching rollers, and the pressure means which acts on the head mounting means, in cooperating and equalizing relation to each other, regardless of the p.s.i. being exerted on the stitching rollers, so that the "feel" to the operator manipulating the stitching head is the same at all times.

Another object of the invention is to mount the stitching rollers in relation to the tire-supporting wheel in such a manner that said rollers, as they swing up and down during a stitching operation, always remain in a plane radially of the tire; this being a feature which contributes to a smooth and distortionless application of the new tread rubber to the tire.

It is also an object of the invention to provide a practical, reliable, and durable tread builder for tire retreading, and one which will be exceedingly effective for the purpose for which it is designed.

These objects are accomplished by means of such structure and relative arrangement of parts as will fully appear by a perusal of the following specification and claims.

In the drawings:

FIG. 2 is a similar fragmentary view, but showing a tire mounted on the wheel, and with the stitching head in a lowered operating position.

FIG. 3 is an enlarged top plan view of the mounting and assist structure for the supportnig links of the stitching head.

FIG. 4 is a sectional elevation substantially on line 4—4 of FIG. 3, but showing the complete assist structure and its connection with the wheel supporting pedestal of the tread builder.

FIG. 5 is a front end elevation of the stitching head detached, and shown partly in section and with the stitching rollers in their initial horizontally alined position.

FIG. 6 is a sectional elevation of the stitching head, taken on line 6—6 of FIG. 5.

Figure 1:
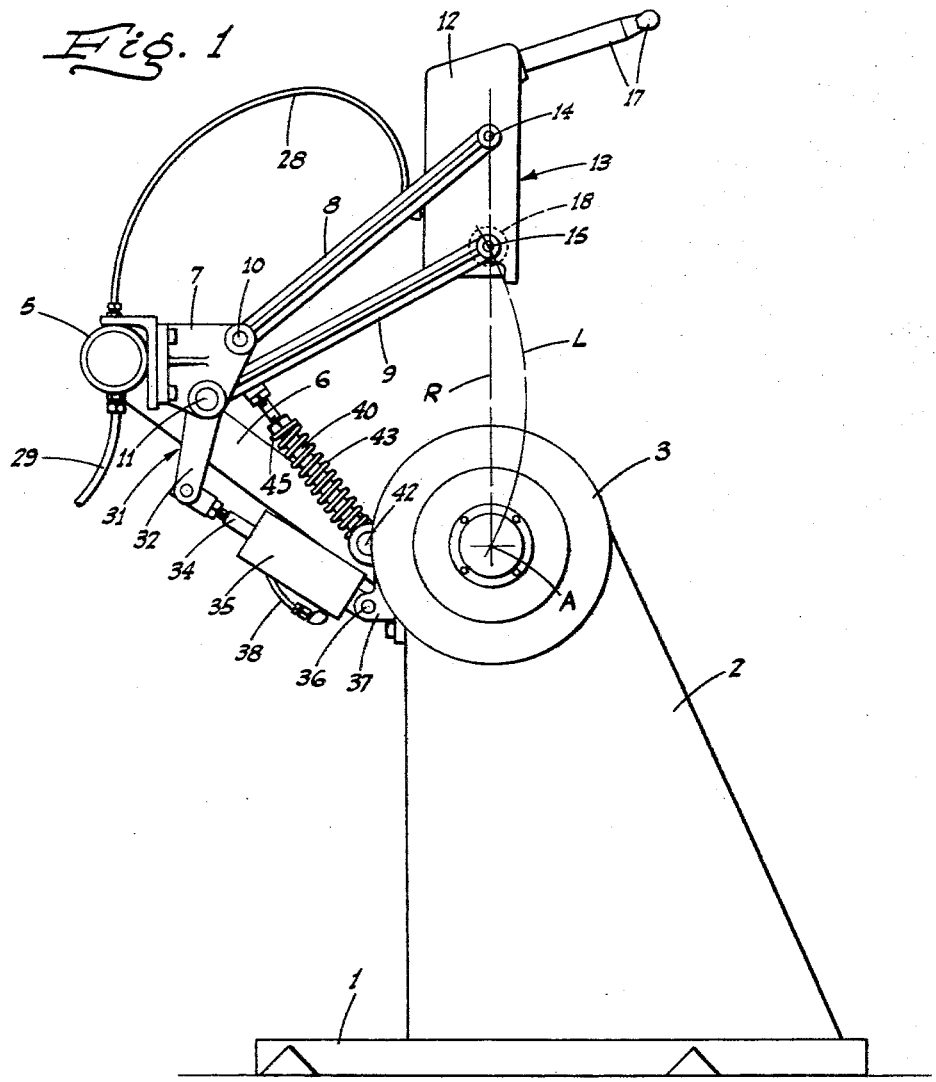
FIG. 1 is a side elevation of the improved tread builder, showing the stitching head in its fully raised position relative to the tire supporting wheel, and before a tire is mounted on such wheel.

Referring now more particularly to the drawings, and to the characters of reference marked thereon, the tread builder compises a base 1 on which an upstanding pedestal 2 is mounted. The pedestal on one side and at the upper end thereof supports a mounting wheel 3 for an inflated tire 4. This wheel is disposed with its axis horizontal and is driven, by suitable means mounted within the pedestal, so that the wheel and tire at the top turn toward the rear, as indicated by the arrow in FIG. 2.

Disposed some distance rearwardly of and above the pedestal and wheel is a transverse beam 5, which at one end is rigidly supported from the pedestal 2 by means of a rigid arm 6 which extends upwardly and rearwardly from such pedestal on the side thereof opposite the wheel 3, so that it offers no interference with the placing of the tire 4 on, or removal of the same from, the wheel.

It will be noted that the beam 5 is hollow, and is sealed at its ends so as to be airtight. By reason of this form of construction, said beam also forms an air tank, for the purpose which will be seen hereinafter.

Rigidity secured to and projecting forwardly from the beam 5 is a pair of brackets 7, spaced apart along the beam a distance greater than the width of the wheel 3 or any tire 4 mounted thereon, and symmetrically disposed, transversely, relative to such wheel. Upper and lower links 8 and 9, respectively, project forwardly from each bracket 7; the upper links 8 being individually pivoted in the respective brackets by transverse pins 10, while the lower links 9 are pivotally mounted in the brackets and also connected to each other by a transverse shaft 11 which is parallel to the axis of wheel 3.

The links 8 and 9 at their forward ends are pivotally connected, in vertically spaced relation, to the sides of the housing 12 of the stitching head 13 of the tread builder, as at 14 and 15, respectively. The links 8 and 9 are the same length, which length is also equal to the distance between the pivotal shaft 11 of the lower links 9 and the axis A of the wheel 3, as indicated by the line L in FIG. 1. The straight-line distance between link pivot pins 10 and shaft 11 is less than the similar distance between the link pivots 14 and 15. The pivot pins 10, however, are disposed in the brackets 7 a sufficient distance ahead of the pivot shaft 11 so that the pivots 14 and 15 always lie in planes radially of the wheel, regardless of the vertically swung position of the stitching head 13, as shown by lines R and R' in FIGS. 1 and 2, respectively. The purpose of this arrangement will be made clear later.

The housing 12 of the stitching head 13, which will now be described, is a rigid member of inverted U-shaped form in a direction transversely of the wheel 3 and tire 4, adapted to straddle a tire 4, and including spaced front and rear walls 16, the laterally facing edges of which are spaced apart sufficiently to accommodate a tire of any width therebetween. A suitable handle member 17 projects forwardly from the housing at the top thereof, so that the operator may manipulate the stitching head 13 up and down from in front of the tire as the stitching operation progresses.

The cooperating, normally transversely extending opposed stitching rollers 18, which may be of any desired configuration and construction, are mounted and controlled in the following manner:

For each roller there is a mounting shaft 19, supported at its ends in the housing walls 16 adjacent the lower ends thereof and just below said roller 18. A sleeve 20 is turnable on the shaft 19, and extends the full length thereof between the housing walls 16, as shown in FIG. 6. A lug 21 is rigid with and upstands from the sleeve 20 adjacent its forward end and rigidly supports the spindle 22 on which the roller 18 is turnably mounted;

said spindle, when in a horizontally extending position, being alined with the pivot 15 of the adjacent link 9, as indicated in FIG. 1.

An arm unit 23 is rigid with and projects laterally out from the sleeve 20 adjacent its rear end, and at its outer end is connected to the piston rod 24 of a compressed air cylinder 25 upstanding from the arm unit 23 within the confines of the housing 12, and pivotally connected at its upper end to said housing, as shown at 26.

Figure 7:
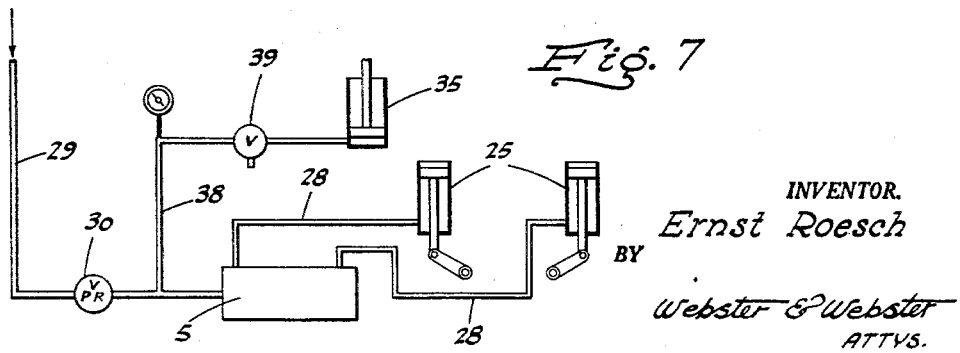
FIG. 7 is a diagram of the compressed air system which power-assists the downward movement of the stitching head, and also exerts an adjustable resistance to the upward swinging movement of the stitching rollers when in contact with a tire and the stitching head is being lowered.

The above described parts are arranged so that when the roller 18 is in a horizontal position the piston 27 of cylinder 25 is at its topmost position in the cylinder, as shown in FIG. 5. Compressed air is maintained in the cylinders 25 of both rollers 18 at any desired and adjustable pressure by means of conduits 28 leading to the lower ends of cylinders 25 from the air tank 5. An air supply conduit 29 leads to the tank from a source of pressure; an adjustable pressure control and relief valve 30 being interposed in said conduit 29, as shown in FIG. 7.

It will be noted that the conduits 28 connect to the top of the tank 5 in about the same transversely spaced relation as the spacing of the cylinders 25, and are flexible and convexly curved so that the housing 12 of the stitching head 13, and on which housing said cylinders 25 are mounted, may move up and down without interfering with the free flow of air to and from the cylinders, and without such conduit possibly interfering with the wheel-mounted tire 4. The beam 5, serving both as a mounting for the link-supporting brackets, and as an air tank, greatly simplifies the conduit arrangement over what would otherwise be necessary.

By reason of the stitching-roller control means above described, it will be seen that as the stitching head is lowered by the operator and the stitching rollers 18 contact the camelback C being wrapped about the tire and gradually tilt as they follow the convex curvature of the camelback, the same uniform pressure is exerted by the rollers against the camelback irrespective of the position said rollers may be caused to assume. At the same time, such uniform pressure may be changed—at the will of the operator—by adjusting the valve 30 to suit different conditions of operation; such valve being of course mounted on the tread builder in a position convenient to the operator.

By reason of the specific mounting and arrangement of the links 8 and 9 relative to the stitching head 13 and to the wheel 3, and of the stitching rollers 18 relative to the lower links 9, said rollers, as they move down the sides of the tire and become upwardly tilted, will always remain in a plane radially of the tire; thus contributing to a distortionless application of the tread rubber.

It will also be noted that as the rollers tilt, the pistons 27 move in the cylinders 25, forcing some of the air out and back to the tank 5. Since the tank volume is very large compared to the cylinder volume, the change in the air pressure is negligible, and hence a practically uniform pressure in the cylinders throughout the piston movement and the accompanying roller tilting movement is assured.

A power assist to the vertical downward movement of the stitching head 13 is obtained in the following manner:

Secured to the shaft 11 at the end thereof adjacent the arm 6 is a bellcrank 31, having one arm 32 thereof projecting downwardly, while the other and shorter arm 33 projects upwardly and to a certain extent forwardly, as shown in the generally midway position of the bellcrank in FIG. 4.

Connected to the outer end of the arm 32 is the forwardly extending piston rod 34 of a compressed air cylinder 35, which at its forward end is pivotally connected, as at 36, to a bracket 37 mounted on the rear side of the pedestal 2 adjacent its upper end, as shown in FIG. 4. Air is supplied to the lower end of the cylinder 35 from a conduit 38 which is connected to the supply conduit 29 at a suitable point, such as between the valve 30 and the tank 5, as shown in FIG. 7. A hand valve 39 is interposed in conduit 38 so that the air may be shut off or exhausted from the cylinder 35 if desired.

A rod 40 is pivoted at its rear end, as at 41, on the short arm 33 of the bellcrank 31, and extends thence forwardly and downwardly, and at its lower forward end slidably projects through a transverse member 42 which is swivelly mounted in the bracket 37. A compression spring 43 is disposed about the rod 40 and extends between a stop washer 44 slidable on the rod and engaging the member 42, and another stop washer 45 adjustably fixed on the rod 40 so that the normal tension on the spring may be adjusted.

By reason of the above arrangement of parts, the weight of the stitching head 13 is balanced, while any desired amount of downward pressure, acting against the resistance of the spring 43, may be exerted against the stitching head 13 by the air cylinder 35, which gives a power assist to the operator pulling down on the handle 17 when effecting a stitching operation.

Because of the interposition of the adjustable pressure valve 30 in the air conduit system, the pressure in the system, feeding both to the cylinder 35 and to the stitching-roller control cylinders 25, may be set at any point between five and sixty p.s.i., as may be required to provide the ideal stitching pressure, and which varies with the thickness, temperature, age, and compounding of the tread rubber.

As far as the feel the operator has as he controls the stitching head, it makes no difference whether a high or low pressure is being applied. This is because the resistance to downward movement of the head caused by the air pressure exerted against the stitching rollers, acting to resist tilting of the same, is counteracted by the air pressure tending to lower or pull down on the stitching head. Thus, the desired stitching is attained without any difference in the manual effort involved, and the adjustable but uniform pressure prevents distortion, thinning, wrinkling, or "tubing" of the tread rubber as it is being applied to the tire. The improved tread builder, constructed and arranged as herein described, therefore assures a uniform job tailored to the individual requirements of each strip of tread rubber.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A tire-tread builder comprising in combination, a pedestal, a wheel mounted on the pedestal adapted to support a tire for treading, a stitching head above the wheel including a casing adapted to straddle such tire, and opposed stitching rollers in the casing; means mounting the rollers in the casing for tilting movement in a vertical plane transversely of the tire, uniform pressure means acting on the rollers and resisting such tilting thereof, means mounting the head in connection with the pedestal for vertical reciprocating movement while maintaining the rollers in a plane radially of the wheel, and pressure means acting on the head mounting means tending to lower the head; the head mounting means comprising transversely spaced brackets mounted in a fixed position rearwardly of the pedestal and head, and upper and lower pairs of links pivoted at one end on the brackets and at the other end on the sides of the casing; the distance from the rear pivot of the lower links to the head pivot thereof being the same as the distance from said rear pivot to the axis of the wheel, and the upper links being pivoted relative to the lower links so as to maintain the rollers, as the head is swung up and down and the rollers become tilted, in a plane radially of the wheel; the rollers being mounted in the casing in axial alinement, when horizontally disposed, with the corresponding pivots of the lower links.

2. A tire-tread builder comprising in combination, a pedestal, a wheel mounted on the pedestal adapted to support a tire for treading, a stitching head above the wheel including a casing adapted to straddle such tire, and opposed stitching rollers in the casing; means mounting the rollers in the casing for upward tilting movement in a plane transversely of the tire, transversely spaced brackets disposed rearwardly of the pedestal and head, a transverse beam rigid with the pedestal on which the brackets are mounted, links extending between the brackets and casing supporting the latter for reciprocating movement in a vertical plane, and a handle connected to and projecting forwardly from the casing for operator manipulation of the head.

3. A tread builder, as in claim 2, with compressed air means acting on the links to aid in lowering the head, and other compressed air means operatively connected to the roller mounting means to resist upward tilting movement of the rollers and acting in opposition to the first named compressed air means.

4. A tread builder, as in claim 3, with spring means substantially balancing the weight of the head.

5. A tread builder, as in claim 3, in which the beam is hollow and sealed at its ends to form a compressed air tank, with a compressed air supply conduit connected to the tank, and other conduits leading from the tank to said other compressed air means.

6. A tire-tread builder comprising in combination, a pedestal, a wheel mounted on the pedestal adapted to support a tire for treading, a stitching head above the wheel including a casing adapted to straddle such tire, and opposed stitching rollers in the casing; means mounting the rollers in the casing for tilting movement in a vertical plane transversely of the tire, uniform pressure means acting on the rollers and resisting such tilting thereof, means mounting the head in connection with the pedestal for vertical reciprocating movement while maintaining the rollers in a plane radially of the wheel, and pressure means acting on the head mounting means tending to lower the head; the head mounting means including transversely spaced pairs of upper and lower links projecting rearwardly from and pivoted at their forward ends to the sides of the casing, brackets mounted in a fixed position rearwardly of the head to which the links extend, and pivot means between the brackets and links at their rear ends, the links being arranged to cause the head to move in a plane radially of the tire when the links are swung; and the pivot means for the lower ones of the links comprising a transverse shaft extending between and turnable in the brackets and in which said links are fixed, a radial arm rigid with the shaft, and an air pressure cylinder connected at one end to the arm and at the other end to the pedestal and functioning to move the arm in a direction to lower the links.

7. A tread builder, as in claim 6, with spring means acting on the links in opposition to the cylinder to balance the weight of the head.

8. A tire-tread builder comprising a wheel mounted for controlled rotation and adapted to support a tire for treading, a stitching head above the wheel including a casing adapted to straddle such tire, and opposed stitching rollers in the casing; and means mounting the head for vertical reciprocating movement relative to the wheel while maintaining the axes of the rollers in a plane radially of said wheel; such mounting means comprising, with transversely spaced brackets secured in a fixed position rearwardly of the head, transversely spaced pairs of upper and lower links extending between the casing and brackets, and pivot means connecting the related ends of the links to the casing and brackets arranged relative to each other, to the axes of the rollers, and to the axis of the wheel in a manner to cause the axes of the rollers to remain in such radial plane as the head is moved up and down.

9. A tread builder, as in claim 8, with adjustable pressure means applied to corresponding ones of the transversely spaced pairs of links to assist in the downward swinging movement of the links, and head-weight balancing means acting in opposition to the pressure means.

References Cited by the Examiner
UNITED STATES PATENTS

| | | | |
|---|---|---|---|
| 1,276,436 | 8/18 | Stevens | 156—408 X |
| 1,676,840 | 7/28 | Shively | 156—408 |
| 1,919,384 | 7/33 | Slusher | 156—409 |
| 2,604,420 | 7/52 | Barber | 156—409 |
| 2,681,684 | 6/54 | Gilletta et al. | 156—410 X |
| 2,998,053 | 8/61 | Appleby | 156—410 |
| 3,030,261 | 4/62 | Roesch | 156—411 |
| 3,056,448 | 10/62 | Dearing | 156—411 |

EARL M. BERGERT, *Primary Examiner.*